June 12, 1934.  W. J. HORTON ET AL  1,962,393
CULTIVATOR
Filed Aug. 25, 1933
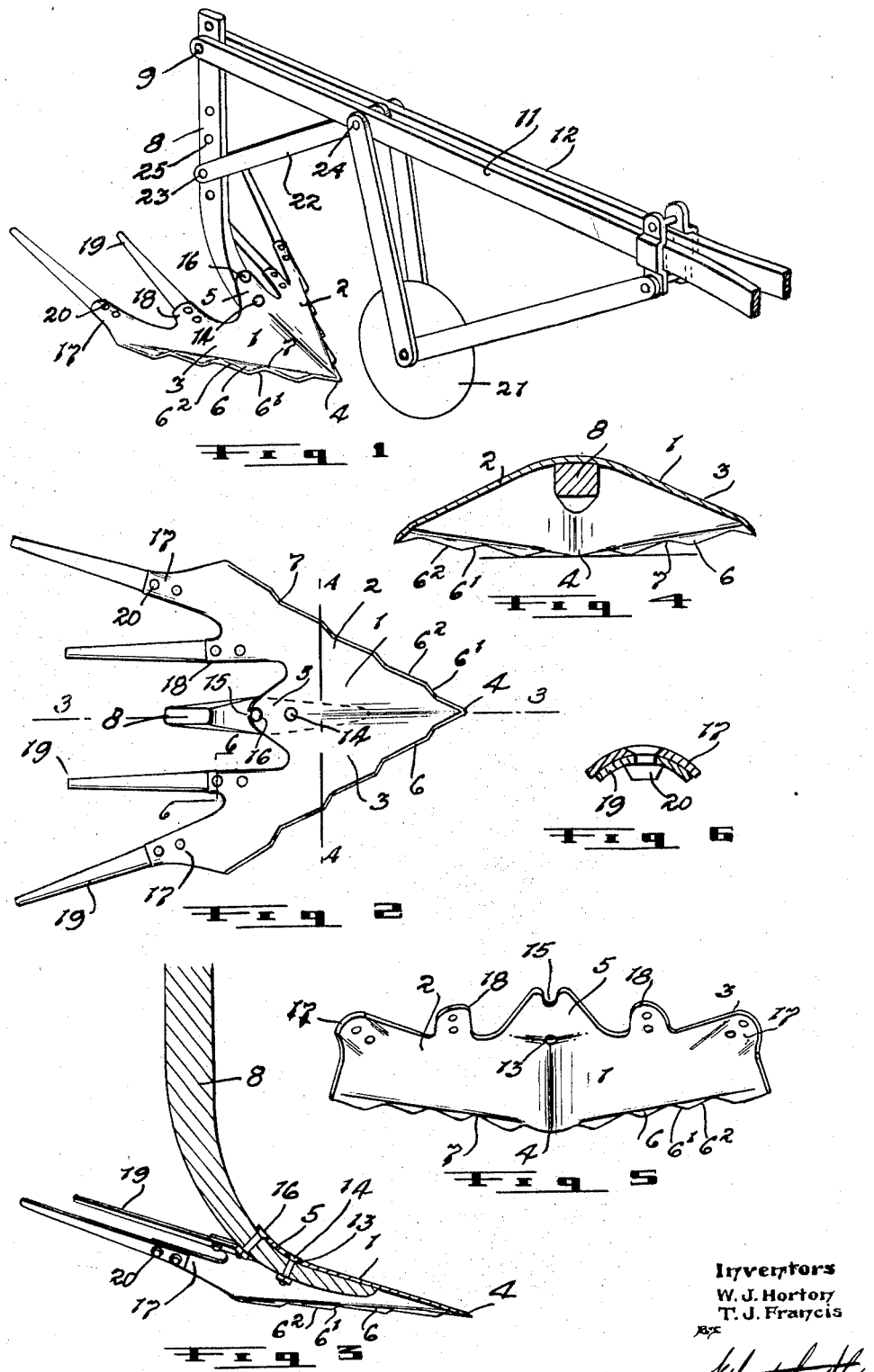
Inventors
W. J. Horton
T. J. Francis Patented June 12, 1934

1,962,393

UNITED STATES PATENT OFFICE 1,962,393

CULTIVATOR

William J. Horton and Thomas J. Francis, East Kildonan, Manitoba, Canada

Application August 25, 1933, Serial No. 686,686

3 Claims. (Cl. 97—207)

The invention relates to improvements in cultivators and particularly to cultivating blades and associated parts and an object of the invention is to provide a cutting blade having a sharpened saw tooth cutting edge disposed at an angle to the direction of travel and with the teeth so arranged that both edges thereof cut the ground and have a natural tendency to be self sharpening under the influence of the earth on which they are working.

A further object of the invention is to provide a blade having the inclining wings thereof flat faced or non-curved so that there will be positively no tendency for the earth to accumulate on the blade and further to arrange the teeth at the lower edges of the blade so that the blade has a natural tendency when working to dig downwardly into the soil, such being accomplished by down turning the teeth at an angle to the plane of the wing.

A further object is to provide similar trailing fingers located at the rear edge of the blade and all attached to the blade in a similar manner so that they are interchangeable and further to design the fastening so that the fingers are held firmly in position and can be attached to the blade easily, quickly and effectively.

With the above more important objects in view, the invention consists essentially in the arrangement and construction of parts hereinafter more particularly described, reference being had to the accompanying drawing, in which:—

Fig. 1 is a perspective view of the device.

Fig. 2 is a plan view of the blade and associated parts.

Fig. 3 is a vertical sectional view at 3—3 Figure 2.

Fig. 4 is a cross sectional view at 4—4 Figure 2.

Fig. 5 is an enlarged rear view of the blade with the fingers and shank removed.

Fig. 6 is an enlarged vertical cross sectional view at 6—6 Figure 2.

In the drawing like characters of reference indicate corresponding parts in the several figures.

The cultivator or blade 1 is made from a comparatively heavy gauge sheet metal plate cut into a substantial V-shape to provide angularly disposed side wings 2 and 3 having each a forward cutting edge disposed at an angle to the direction of travel of the cultivator on the ground. The blade gradually rises as it passes rearwardly from the point 4 to the centrally located rearwardly disposed attaching lug 5 and the wings are in an inclined position and are flat faced.

The lower edges of the wings are each provided with a series of cutting teeth 6, it being observed that the teeth are so positioned in relation to the direction of travel of the blade in the ground that both edges 6' and 6² of the teeth cut the ground so that a relatively large exposed cutting area is available. At the points where the teeth join, the corners 7 are rounded so that there is no tendency for material such as weeds and so forth to collect and clog the blade. By observing Figure 2, it will be seen that the entire lower edge of each blade presents a continuous cutting edge from front to rear and that at every point along that edge, the blade gives a shearing cut.

The manner in which the teeth are sharpened is best shown in Figure 4 where it will be seen that the top edge of the blade is the ground face. This insures that the blade will have a natural tendency to be self sharpening when in use.

We wish it also to be particularly noted that each tooth is tilted downwardly in respect to the plane of the blade with the result that the blade has a natural tendency when operating in the field to dig itself into the ground. This is an important feature as in practice, the blade will quickly imbed itself in the ground to the desired depth and has no tendency to work upwardly.

The blade is firmly bolted to the carrying shank 8 which has its upper end fastened by a bolt 9 to the rear ends of a pair of forwardly extending draw bars 11 and 12 and actually the lug 5 is supplied with a lower bolt hole 13 which receives the lower bolt 14 passing through the shank and has the upper end thereof slotted as indicated at 15 to receive the head of a further bolt 16 also passing through the shank. We have found that the bolt holes in the various shanks now found on the market are placed at varying distances apart and for this reason have slotted the upper end of the lug so that the cultivator can be attached to the various shanks as the slot will accommodate any variation in the distance which the bolt holes are found to be apart whch actually does not amount to more than approximately one quarter of an inch.

The rear ends of the wings merge into similar, transversely curved, relatively short arms 17 and the rear edges of the wings in a location somewhat centrally between the lug and the arms 17 merge into further relatively short, transversely curved arms 18. To the arms we connect the forward ends of similar trailing fingers 19, the fingers being pressed to the desired shape from sheet metal and being curved in vertical cross section and gradually diminished in width in passing from their front ends rearwardly.

The fingers are fastened to the arms by placing the forward ends of the fingers underneath the rear ends of the arms to which they are complementary and then firmly fastening the fingers to the arms by a pair of rivets 20 passing through suitable holes provided in the arms and fingers. The arms are so disposed that the fingers diverge rearwardly in the manner best shown in Figure 2.

It will be also observed that the arms are tilted slightly upwardly with the result that when the fingers are attached thereto, the said fingers have their rear ends elevated. By so elevating the fingers, they operate to separate the trash including weeds and so forth from the earth when the blade is working, the earth falling through between the fingers and the weeds and so forth being left on the ground surface. It will be particularly noted that the arms and the fingers are all similarly made, this permitting the fingers to be interchangeable.

A rotary coulter 21 is suitably supported from the draw bar to cut the earth in advance of the point of the blade so that there will be no tendency for the soil to accumulate and clog on the shank and a pair of brace bars 22 are connected by a bolt 23 to the shank and by a bolt 24 to the draw bars. The shank is supplied with a number of holes 25 so that one can readily adjust the position of the shank to tilt the blade to varying cutting angles in regard to the ground.

What we claim as our invention is:—

1. In combination, a V-shaped two winged cultivating blade having similar rearwardly extending suitably spaced attaching arms curved in transverse section, a plurality of similar trailing fingers having their forward ends underlying the arms and transversely curved complementary to the arms, and rivets fastening the fingers to the arms.

2. In combination, a substantially V-shaped two winged cultivating blade having the rear ends of the wings terminating in transversely curved attaching arms, said wings being further provided intermediate of their length with further similar rearwardly extending and transversely curved attaching arms, a plurality of similar interchangeable trailing fingers having their forward ends underlying the arms and transversely curved complementary to the arms, and a pair of rivets fastening the forward ends of the fingers to the arms.

3. In combination, an inclined cultivating blade having the lower edge thereof formed to provide a series of continuous teeth and having each tooth presenting two sharpened cutting edges disposed in regard to the direction of travel of the blade such that both edges cut with an outward shearing action, all teeth being turned down in respect to the plane of the blade, similar rearwardly extending suitably spaced attaching arms curved in transverse section, a plurality of similar trailing fingers having their forward ends underlying the arms and transversely curved complementary to the arms, and rivets fastening the fingers to the arms.

WILLIAM J. HORTON.
THOMAS J. FRANCIS.